United States Patent [19]

Shimada et al.

[11] Patent Number: 4,498,363

[45] Date of Patent: Feb. 12, 1985

[54] JUST INTONATION ELECTRONIC KEYBOARD INSTRUMENT

[75] Inventors: Kengo Shimada, Sagamihara; Yutaka Chiba, Fuchu; Toshio Sanuki, Sagamihara, all of Japan

[73] Assignee: Victor Company of Japan, Ltd., Japan

[21] Appl. No.: 466,364

[22] Filed: Feb. 14, 1983

[30] Foreign Application Priority Data

Feb. 13, 1982 [JP] Japan .................................. 57-21851
Feb. 13, 1982 [JP] Japan .................................. 57-21853

[51] Int. Cl.[3] ......................... G09B 15/02; G10H 1/18

[52] U.S. Cl. ....................................... 84/1.01; 84/451; 84/478; 84/DIG. 8; 84/DIG. 11

[58] Field of Search .................. 84/1.01, 478, DIG. 2, 84/DIG. 8, DIG. 11, 451

[56] References Cited

U.S. PATENT DOCUMENTS

| | | | |
|---|---|---|---|
| 3,986,422 | 10/1976 | Coles | 84/1.01 |
| 4,009,633 | 1/1977 | Coles | 84/1.01 |
| 4,152,964 | 5/1979 | Waage | 84/1.01 |
| 4,248,119 | 2/1981 | Yamada | 84/1.01 |
| 4,332,182 | 6/1982 | Franz et al. | 84/1.01 |
| 4,419,916 | 12/1983 | Aoki | 84/1.01 |
| 4,422,365 | 12/1983 | Iwaki | 84/478 |

*Primary Examiner*—Stanley J. Witkowski

*Attorney, Agent, or Firm*—Andrus, Sceales, Starke & Sawall

[57] ABSTRACT

A just intonation electronic keyboard instrument comprises a plurality of tonality selection switches for selecting each key from among twenty-four just intonation keys, a control circuit for determining one or a plurality of just intonation keys according to the manipulation of said switches, a variable frequency oscillator having its output oscillation frequency varied in accordance with the selected key, and a frequency dividing circuit having frequency dividers which are varied of their frequency dividing ratios according to the selected key. The number of tonality selection switches is less than twenty-four. The control circuit discriminates the selection to a major scale or a minor scale, and discriminates one or a plurality of keys from each of twelve keys from C through B, and determines one or a plurality of selected just intonation keys, according to the manipulation of said intonation selection switches. The variable frequency oscillator produces an output oscillation frequency which is an integral multiple of a frequency of a key-note of the determined key. The frequency dividing ratios of the frequency dividers are respectively varies so that ratios among frequency dividing ratios are in accordance with a temperament of the determined just intonation key.

14 Claims, 12 Drawing Figures

FIG. 3

| PITCH NAMES | TEMPERAMENT | KEY NAMES: C | D | E | G | A | B | $D^{\flat}$ | $E^{\flat}$ | F | $G^{\flat}$ | $A^{\flat}$ | $B^{\flat}$ |
|---|---|---|---|---|---|---|---|---|---|---|---|---|---|
| $C^{\flat}_4$ | | | | | | | | | | | 247.2 | | |
| $C_4$ | 261.6 | 264.0 | | | 264.0 | | | 260.7 | 260.7 | 264.0 | | 260.7 | 264.0 |
| $C^{\#}_4$ | | | 276.4 | 275.0 | | 275.0 | 276.4 | | | | | | |
| $D^{\flat}_4$ | | | | | | | | 276.1 | | | 276.1 | 276.1 | |
| $D_4$ | 293.7 | 297.0 | 297.0 | | 297.0 | 293.3 | | | 293.3 | 293.3 | | | 293.3 |
| $D^{\#}_4$ | | | | 309.4 | | | 309.4 | | | | | | |
| $E^{\flat}_4$ | | | | | | | | 312.9 | 312.9 | | 309.0 | 312.9 | 312.9 |
| $E_4$ | 329.6 | 330.0 | 334.1 | 330.0 | 330.0 | 330.0 | 330.0 | | | 330.0 | | | |
| $F_4$ | 349.2 | 352.0 | | | | | | 347.6 | 352.0 | 352.0 | 347.6 | 347.6 | 352.0 |
| $F^{\#}_4$ | | | 371.2 | 371.2 | 371.2 | 366.7 | 371.2 | | | | | | |
| $G^{\flat}_4$ | | | | | | | | 370.6 | | | 370.6 | | |
| $G_4$ | 392.0 | 396.0 | 396.0 | | 396.0 | | | | 351.1 | 396.0 | | 391.1 | 391.1 |
| $G^{\#}_4$ | | | | 412.5 | | 412.5 | 412.5 | | | | | | |
| $A^{\flat}_4$ | | | | | | | | 417.2 | 417.2 | | 417.2 | 417.2 | |
| $A_4$ | 440.0 | 440.0 | 445.5 | 440.0 | 445.5 | 440.0 | | | | 440.0 | | | 440.0 |
| $A^{\#}_4$ | | | | | | | 464.1 | | | | | | |
| $B^{\flat}_4$ | | | | | | | | 463.5 | 469.3 | 469.3 | 469.5 | 469.3 | 469.3 |
| $B_4$ | 493.9 | 495.0 | 495.0 | 495.0 | 495.0 | 495.0 | 495.0 | | | | | | |
| $C^{\flat}_3$ | | | | | | | | | | | 494.4 | | |
| $C_3$ | 523.3 | 526.0 | | | 526.0 | | | 521.5 | 521.5 | 526.0 | | 521.5 | 526.0 |
| $C^{\#}_3$ | | | 556.9 | 550.0 | | 550.0 | 556.9 | | | | | | |

FIG. 5

| PITCH NAMES | TEMPERAMENT | KEY NAMES: A | B | C# | E | F# | G# | $B^{\flat}$ | C | D | $E^{\flat}$ | F | G |
|---|---|---|---|---|---|---|---|---|---|---|---|---|---|
| $A^{\flat}_3$ | | | | | | | | 213.6 | 211.2 | | 211.2 | 211.2 | |
| $A_3$ | 220.0 | 220.0 | 222.7 | 222.7 | 220.0 | 222.7 | | | | 220.0 | | | 222.7 |
| $A^{\#}_3$ | | | | | | | 234.9 | | | | | | |
| $B^{\flat}_3$ | | | | | | | | 237.6 | 237.6 | 234.7 | 237.6 | 234.7 | 237.6 |
| $B_3$ | 246.9 | 247.5 | 247.5 | 250.6 | 247.5 | 247.5 | 250.6 | | | | | | |
| $C^{\flat}_4$ | | | | | | | | | | | 253.4 | | |
| $C_4$ | 261.6 | 264.0 | | | 264.0 | | | 267.3 | 264.0 | 264.0 | | 264.0 | 264.0 |
| $C^{\#}_4$ | | | 276.4 | 276.4 | | 276.4 | 276.4 | | | | | | |
| $D^{\flat}_4$ | | | | | | | | 265.1 | | | 265.1 | 261.6 | |
| $D_4$ | 293.7 | 293.3 | 297.0 | | 297.0 | 297.0 | | | 297.0 | 293.3 | | | 297.0 |
| $D^{\#}_4$ | | | | 313.2 | | | 313.2 | | | | | | |
| $E^{\flat}_4$ | | | | | | | | 313.2 | 316.6 | | 316.6 | 316.6 | 316.6 |
| $E_4$ | 329.6 | 330.0 | 330.0 | 334.1 | 330.0 | 334.1 | 334.1 | | | 330.0 | | | |
| $F_4$ | 349.2 | 352.0 | | | | | | 356.4 | 352.0 | 352.0 | 356.4 | 352.0 | 356.4 |
| $F^{\#}_4$ | | | 371.2 | 371.2 | 371.2 | 371.2 | 375.9 | | | | | | |
| $G^{\flat}_4$ | | | | | | | | 360.2 | | | 360.2 | | |
| $G_4$ | 392.0 | 396.0 | 396.0 | | 396.0 | | | | 396.0 | 391.1 | | 396.0 | 396.0 |
| $G^{\#}_4$ | | | | 417.6 | | 417.6 | 417.6 | | | | | | |
| $A^{\flat}_4$ | | | | | | | | 427.7 | 422.4 | | 422.4 | 422.4 | |
| $A_4$ | 440.0 | 440.0 | 445.5 | 445.5 | 440.0 | 445.5 | | | | 440.0 | | | 445.5 |
| $A^{\#}_4$ | | | | | | | 469.9 | | | | | | |

JUST INTONATION ELECTRONIC KEYBOARD INSTRUMENT

BACKGROUND OF THE INVENTION

The present invention generally relates to just intonation electronic keyboard instruments, and more particularly to a just intonation electronic keyboard instrument capable of obtaining just intonation notes of a desired key by simple operation of switches.

In the present specification, in order to prevent confusion between the key of music and the key of the keyboard instrument, the key of the keyboard instrument will hereinafter be referred to as the instrument key.

The temperament of just intonation is a frequency series wherein the key-note and each of the notes are in relationships described by frequency ratios which are simple integral ratios, that is, the frequency ratio between two notes in the fifth relationship is 3:2, and the frequency ratio of two notes in the major third relationship is 5:4, for example. In this just intonation, a pure consonance is obtained from the primary triads, and it is possible to realize music having an extremely beautiful sound in the case of unaccompanied chorus and string music. In addition, notes of this kind of temperament is most easily produced by vocal music and string music. For example, the temperament of just intonation is used during a chorus performance wherein pure chords are to be obtained.

During practice of the chorus which uses the temperament of just intonation, it will be effective for teaching purposes if there is a keyboard instrument tuned according to the temperament of just intonation. However, normal keyboard instruments are generally tuned according to the temperament of twelve-temperament.

As described before, the temperament of just intonation is a frequency series wherein the key-note and each of the notes are in relationships described by frequency ratios which are simple integral ratios. Moreover, when modulation is performed to change the key-note, the frequency series of the key-note and each of the notes differ for each of the keys. There are thirty keys including major keys and minor keys. However, because there are six keys in which the scale may be formed by mutually identical keys, it is only necessary to consider twenty-four keys in keyboard instruments. But, an extremely large number of instrument keys will be required to design a keyboard instrument which can freely modulate in the just intonation with respect to these twenty-four keys, and a keyboard instrument having such capabilities could not be realized. Further, in a keyboard instrument which is provided with twelve instrument keys between the C note and the B note and tuned according to a specific key of the just intonation, the key with which the instrument can play became limited because the temperament becomes shifted from the temperament of just intonation when the modulation is performed. Hence, the practical value of this kind of a keyboard instrument was poor.

On the other hand, an instrument tuned according to the equal-temperament cannot obtain perfect chords when compared to an instrument tuned according to the temperament of just intonation. However, the instrument tuned according to the temperament of equal-temperament is capable of obtaining chords which sound substantially natural, and in addition, the modulation operation is simple. For this reason, general electronic keyboard instruments, piano, and the like were conventionally tuned according to the temperament of equal-temperament. However, the chords obtained from the keyboard instruments and the electronic keyboard instruments which are tuned according to the temperament of equal-temperament are not perfect chords as described before, and these instruments are unfit for use in teaching during chorus practice, for example.

As discussed heretofore, it is extremely difficult to realize a keyboard instrument tuned according to the temperament of just intonation which may be effectively used for teaching chorus, as an instrument having the normal construction of a keyboard instrument. However, it is relatively easy to realize such a keyboard instrument as an electronic keyboard instrument. Thus, electronic keyboard instruments capable of easily performing modulation to any key among the twenty-four keys, and also capable of producing sound in accordance with the temperament of just intonation during play in any key among the twenty-four keys, have recently been proposed.

In the conventional just intonation electronic keyboard instrument, the twenty-four keys are displayed by a line of characters such as "C major, . . . , B minor", along the horizontal direction, in an order of the instrument keys acting as the key note according to the order of the instrument keys of the keyboard instrument. Further, tonality switches are provided above the corresponding display characters. The keyboard instrument is set so that just intonation sound of a tonality is obtained, by manipulating these tonality selection switches. However, the tonality display in this conventional keyboard instrument is simply a display in which the tonality is arranged according to the order of the instrument keys. Hence, it was difficult to understand the relationship of the selected tonality. In addition, the operation of the switches was troublesome to perform, because there were so many switches. Therefore, there was a disadvantage in that erroneous operations may be performed, especially in a case where the player is unskilled.

SUMMARY OF THE INVENTION

Accordingly, it is a general object of the present invention to provide a novel and useful just intonation electronic keyboard instrument in which the above described disadvantages have been overcome.

Another and more specific object of the present invention is to provide an electronic keyboard instrument which is provided with an octave of instrument keys for tonality selection in continuous with instrument keys for play, and designed so that just intonation sound of the tonality in which the key-note is the note corresponding to a certain instrument key can be obtained by pushing (playing) that certain instrument key. According to the keyboard instrument of the present invention, a desired key can be swiftly selected by manipulating (playing) the instrument keys in the same manner as that upon normal play.

Still another object of the present invention is to provide an electronic keyboard instrument which is provided with an octave of instrument keys for tonality selection, and the key name, key-signature by the score and the accidentals, the pitch name by the score and the notes, and the like are respectively displayed on each of the instrument keys for each case where the same instrument key is the key-note instrument key. According to the keyboard instrument of the present invention, it is easy even for a beginner to understand the relationship between the instrument keys and the key names, the instrument keys and the key-signatures, and the like, and moreover, the operation is simple.

Another object of the present invention is to provide an electronic keyboard instrument in which characters of each of the keys of the related keys and related keys selection switches are provided in correspondence on an operation panel, and the just intonation sound of a related key is obtained by the operation of these switches. According to the keyboard instrument of the present invention, it is easy to understand the relationship, and the operation is simple.

Other objects and further features of the present invention will be apparent from the following detailed description when read in conjunction with the accompanying drawings.

BRIEF DESCRIPTION OF THE DRAWINGS

FIG. 3 shows the frequency of each sound in the just intonation major scale;

FIG. 5 shows the frequency of each sound in the just intonation minor scale;

DETAILED DESCRIPTION

Figure 1:
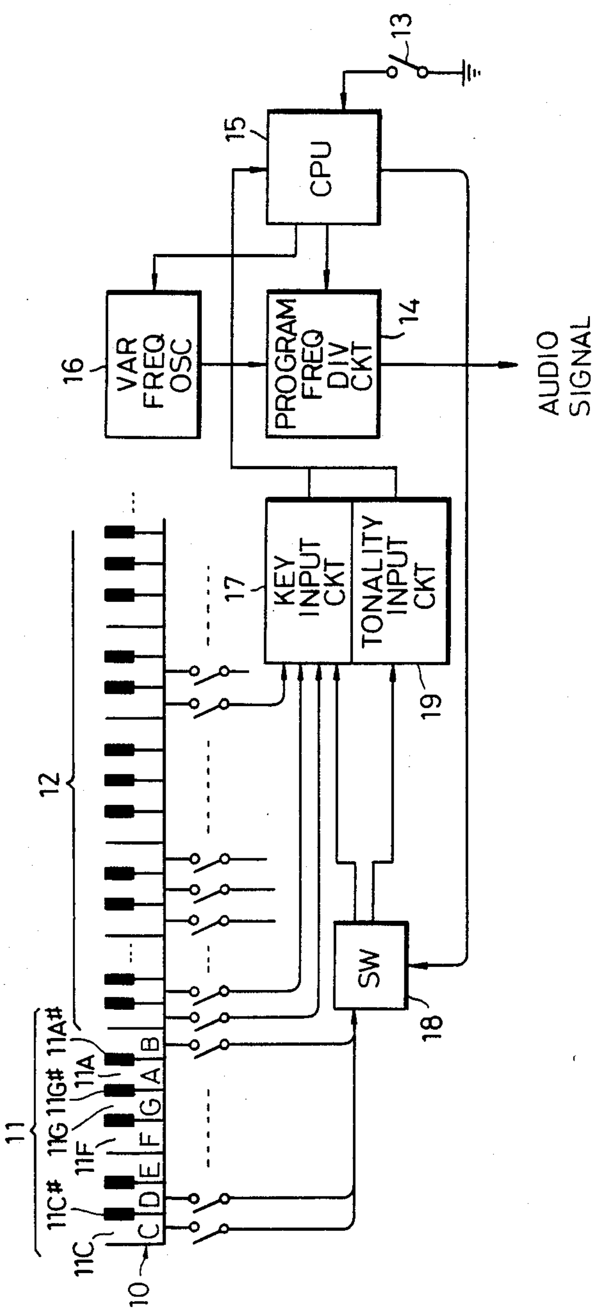
FIG. 1 is a systematic block diagram showing an embodiment of a just intonation electronic keyboard instrument according to the present invention.

In FIG. 1, a lower keyboard 10 comprises instrument keys (hereinafter simply referred to as selection keys) 11 for tonality selection and play, and instrument keys 12 for general play. An octave of the selection keys 11 are provided at the bass side of the play keys 12, and the selection keys 11 have the same construction as the play keys 12. The selection keys 11 can also be used as instrument keys for general play, and for example, the selections keys 11 may be used as tonality selection keys by turning a modulation specifying switch 13 ON, and as instrument keys for general play by turning the switch 13 OFF.

Figure 2:
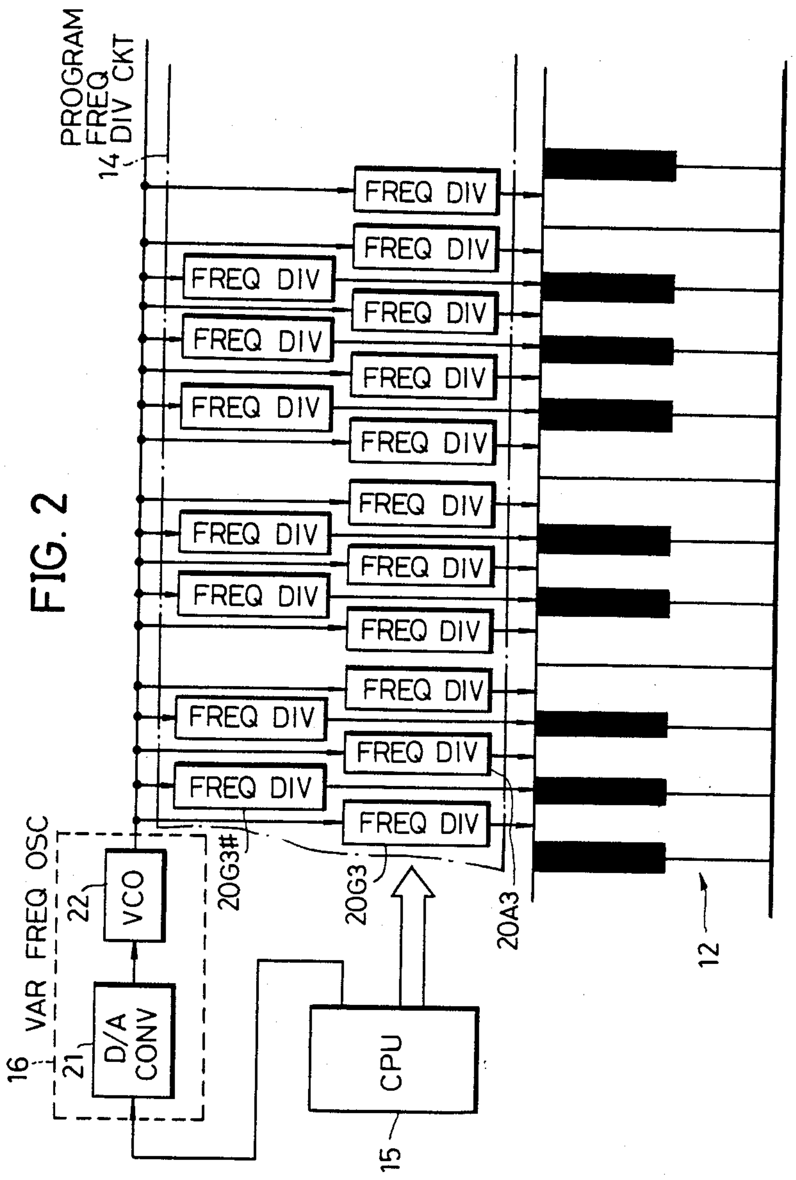
FIG. 2 is a diagram showing the correspondence of each of frequency dividers in a programmable frequency dividing circuit shown in FIG. 1 and the instrument keys.

A programmable frequency dividing circuit 14 comprises frequency dividers $\mathbf{20}_{G3}$, $\mathbf{20}_{G3\sharp}$, $\mathbf{20}_{A3}$, . . . which are provided in correspondence with each of the keys in the keyboard 10, as shown in FIG. 2. Frequency dividing ratios of each of the frequency dividers of the programmable frequency dividing circuit 14 are simultaneously varied by a control signal from a central processing unit (CPU) 15, according to the manipulation of the selection keys 11 upon tonality selection. The frequency dividing ratios of each of the frequency dividers are preset sot that these frequency dividing ratios form constant ratios based on the frequency dividing ratio of the frequency divider corresponding to the instrument key of the key-note in a key, with respect to each of the major and minor scales in the just intonation key.

A variable frequency oscillator 16 comprises a digital-to-analog (D/A) converter 21 and a voltage controlled oscillator (VCO) 22, as shown in FIG. 2. When the selection keys 11 are manipulated, a control signal is supplied to the variable frequency oscillator 16 from the CPU 15, and the variable frequency oscillator 16 produces a signal having a frequency which is an integral multiple of the frequency of the key-note in the just intonation key in which the key-note corresponds to the manipulated instrument key.

It is now assumed that the output signal frequency of the variable frequency oscillator 16 and the frequency dividing ratios of each of the frequency dividers in the frequency dividing circuit 14 are preset by the control signal from the CPU 15, so that each of the frequencies in C major shown in FIG. 3 can be obtained. When the player pushes (plays) the play keys 12, a signal from the played instrument key is supplied to a key input circuit 17 and then to the CPU 15 wherein the signal is formed into a key input control signal. The key input control signal is supplied to the frequency dividing circuit 14, and the frequency divider corresponding to the played instrument key in the frequency dividing circuit 14 produces a signal for obtaining the just intonation sounds in C major shown in FIG. 3. In this case, a switching circuit 18 is switched over so that an output of the switching circuit 18 is supplied to the key input circuit 17, because the modulation specifying switch 13 is open. Thus, the selection keys 11 can also be used as the instrument keys for general play.

Figure 4:
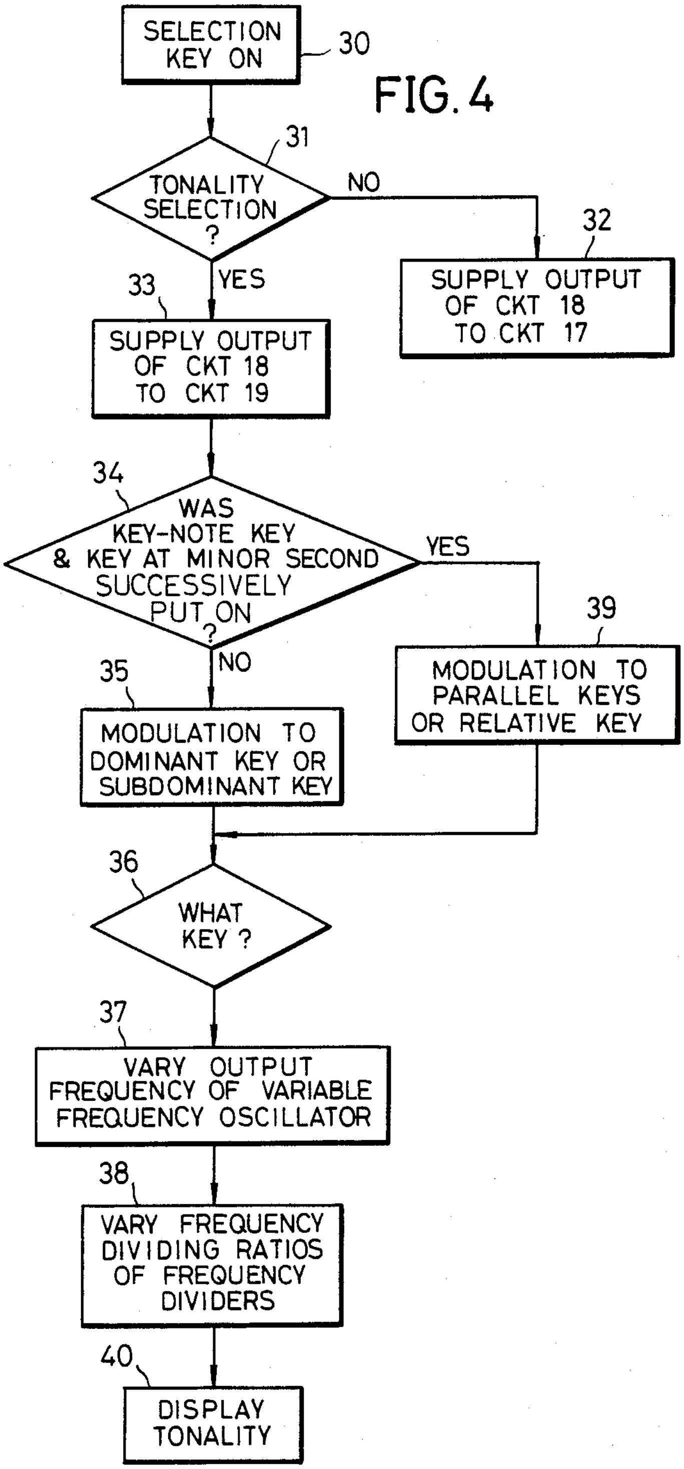
FIG. 4 is a flowchart for explaining the operation of a central processing unit (CPU) of the electronic keyboard instrument according to the present invention.

When the selection keys 11 are pushed (played) as shown by a step 30 in FIG. 4, a control signal from the played selection key is supplied to the key input circuit 17 through the switching circuit 18, and then supplied to the CPU 15 and formed into a key input control signal as shown by steps 31 and 32 in FIG. 4. Hence, in this state, sound corresponding to the played instrument key is generated as in the case where the play keys 12 are played. In this case, sounds which are one octave lower than sounds obtained by playing the play keys 12, can be obtained by playing the selection keys 11. It is assumed that the player is playing music in C major in this state.

Now, assume that the music undergoes modulation to G major which is a dominant key of the original key, that is, C major, halfway through the music. If the player continues to play after modulation to G major, the sound obtained of course becomes unnatural as described before, because the keyboard instrument is tuned according to the just intonation of C major. Accordingly, the player closes the modulation specifying switch 13 when performing modulation to G major. When the switch 13 is closed, a switching signal is supplied to the switching circuit 18 from the CPU 15, and the switching circuit 18 is switched over to supply the output of the switching circuit 18 to a tonality input circuit 19. Hence, in this state, the selection keys 11 are used as tonality selection keys.

Next, the player plays only an instrument key $11_G$ corresponding to the key-note G of G major among the selection keys 11, as shown by the step 30 in FIG. 4. Hence, a signal from the instrument key $11_G$ passes through the switching circuit 18 and the tonality input circuit 19, and is supplied to the CPU 15 wherein the signal is formed into a tonality switching control signal as shown by steps 31 and 33 in FIG. 4. In this case, only the instrument key corresponding to the key-note among the selection keys 11 is played. However, discrimination is carried out at a step 34 shown in FIG. 4, to determine if the instrument key corresponding the key-note and an instrument key at the minor second from the key-note are successively played. Because only the instrument key corresponding to the key-note is played in this case, modulation to the dominant key or the subdominant key of the original key (modulation to the major scale in this case) is discriminated at a step 35 shown in FIG. 4.

A step 36 discriminates which instrument key among the selection keys 11 has been played, that is, what the key is. The key is in G major in this case, and it is discriminated that the key is in G major together with the discriminated result from the step 35 which indicates that the scale is in major. Thus, a digital temperament specifying signal in accordance with G major is obtained from the CPU 15, and supplied to the variable frequency oscillator 16 and the frequency dividing circuit 14 shown in FIG. 2.

The temperament specifying signal is converted into an analog control signal in accordance with G major at the D/A converter 21 within the variable frequency oscillator 16, and supplied to the VCO 22. The VCO 22 is controlled at a step 37 according to the analog control signal from the D/A converter 21, so as to produce a frequency which is an integral multiple of the frequency (396 Hz of the sound $G_4$ in FIG. 3) of the key-note G.

On the other hand, the frequency dividing ratios of each of the frequency dividers in the frequency dividing circuit 14 are varied at a step 38, based on the frequency dividing ratio of the frequency divider corresponding to the instrument key of the key-note in the selected G major, according to the temperament specifying signal from the CPU 15. That is, the frequency dividing ratios of each of the frequency dividers corresponding to the instrument keys other than the instrument key of the key-note are varied, so that ratios between these frequency dividing ratios and the frequency dividing ratio of the frequency divider corresponding to the key-note are in accordance with the temperament of just intonation in G major.

In a state where the output oscillation frequency of the variable frequency oscillator 16 and the frequency dividing ratios of each of the frequency dividers in the frequency dividing circuit 14 are respectively varied, just intonation sounds in G major shown in FIG. 3 are obtained when the player plays the play keys 12. In this case, the modulation specifying switch 13 may be opened once G major is set. The selection keys 11 can also be used as keys for general play by opening the switch 13, and just intonation sounds in G major which are one octave lower than the sounds obtained by playing the play keys 12, may be obtained by playing the selection keys 11.

Upon modulation to E major in the subdominant key from C major, an instrument key $11_F$ among the selection keys 11 is similarly played as in the case described heretofore. In this case, a temperament specifying signal in accordance with F major is produced from the CPU 15. This temperament specifying signal is supplied to the variable frequency oscillator 16 and the frequency dividing circuit 14, to vary the output oscillation frequency of the variable frequency oscillator 16 and vary the frequency dividing ratios of each of the frequency dividers within the frequency dividing circuit 14. Accordingly, the variable frequency oscillator 16 and the frequency dividing circuit are set so that just intonation sounds in F major shown in FIG. 3 can be obtained.

On the other hand, when obtaining the C minor which is in the parallel keys of C major from C major, the switch 13 is closed, and an instrument key $11_C$ corresponding to the key-note of the key obtained after modulation and an instrument key $11_{C\#}$ at the minor second from that key-note among the selection keys 11 are played in a successive manner. In this case, the CPU 15 discriminates the modulation from a key to the parallel keys or the relative key of that key (modulation to the minor scale from the major scale in this case), as shown by steps 34 and 39 in FIG. 4.

Next, the step 36 discriminates which instrument key was played, that is, what the key is after the modulation. In this case, the key is in C, and by using the discriminated result obtained from the step 39 which indicates that the modulation is to the minor scale, it is discriminated that the modulation is to C minor at the step 36. Accordingly, a temperament specifying signal in accordance with C minor is obtained from the CPU 15, and this temperament specifying signal is supplied to the variable frequency oscillator 16 and the frequency dividing circuit 14.

As a result, the variable frequency oscillator 16 is controlled at the step 37, so as to produce a frequency which is an integral multiple of the frequency (264 Hz of the sound $C_4$ in FIG. 5) of the key-note C of C minor.

On the other hand, the frequency dividing ratios of each of the frequency dividers in the frequency dividing circuit 14 are varied at the step 38, based on the frequency dividing ratio of the frequency divider corresponding to the instrument key of the key-note in the selected C minor, according to the temperament specifying signal from the CPU 15. That is, the frequency dividing ratios of each of the frequency dividers corresponding to the instrument keys other than the instrument key of the key-note are varied, so that ratios between these frequency dividing ratios and the frequency dividing ratio of the frequency divider corresponding to the key-note are in accordance with the temperament of just intonation in C minor.

In a state where the output oscillation frequency of the variable frequency oscillator 16 and the frequency dividing ratios of each of the frequency dividers in the frequency dividing circuit 14 are respectively varied, just intonation sounds in C minor shown in FIG. 5 are obtained when the player plays the play keys 12.

Similar operations may be performed to obtain just intonation sounds of other keys. For example, when modulation is to be performed from G minor to B$^{b}$ major which is the relative keys of G minor, a selection key $11_{A\#}$ and a selection key $11_B$ are successively played. If modulation is to be performed from G minor to G major which is the parallel keys of G minor, a selection key $11_G$ and a selection key $11_{G\#}$ are successively played.

As described heretofore, the keyboard instrument shown in FIG. 1 comprises one octave of tonality selection keys 11 in continuous with the play keys 12. Hence, by playing an instrument key among the tonality selection keys 11, a control signal can be obtained for generating just intonation sound of the tonality having a key-note designated by the played instrument key. Accordingly, it is possible to swiftly select and obtain a desired key by operating the keyboard in the same manner as upon normal play. Thus, there is no eed to reach for an operation panel besides the keyboard, such as an operation panel provided with sound effect switches and the like, for performing the selecting operation. In addition, because the tonality selection means employs a keyboard having the same construction as the ordinary keyboard, the tonality selection keys are easier to see and manipulate as compared to levers or buttons having the key-note of the key displayed by characters and the like. Therefore, the actual playing of music can be performed more smoothly.

The description given heretofore applies for modulation to the related keys, however, the modulation is not limited to modulation to the related keys. The just intonation sound of a desired key may be obtained by playing a selection key corresponding to the key-note of the key which is to be obtained by modulation, even if the modulation is to a key which is not a related key. That is, in the case of modulation from a major (minor) scale to a minor (major) scale, the just intonation sound of the desired key may be obtained by playing the selection key corresponding to the key-note of the desired key and the selection key corresponding to the minor second from the key-note.

A pedal and the like may be used instead of a knee lever, in the modulation specifying switch 13.

An alternate design may be employed wherein the modulation specifying switch 13 is not provided. In this case, the selection keys 11 are not used as instrument keys for tonality selection and play, and are used as instrument keys exclusively for tonality selection.

Further, in the embodiment described heretofore, the keyboard 10 of the keyboard instrument according to the present invention was described as being a lower keyboard. However, the keyboard instrument may only comprise one row of keyboard.

Figure 6:
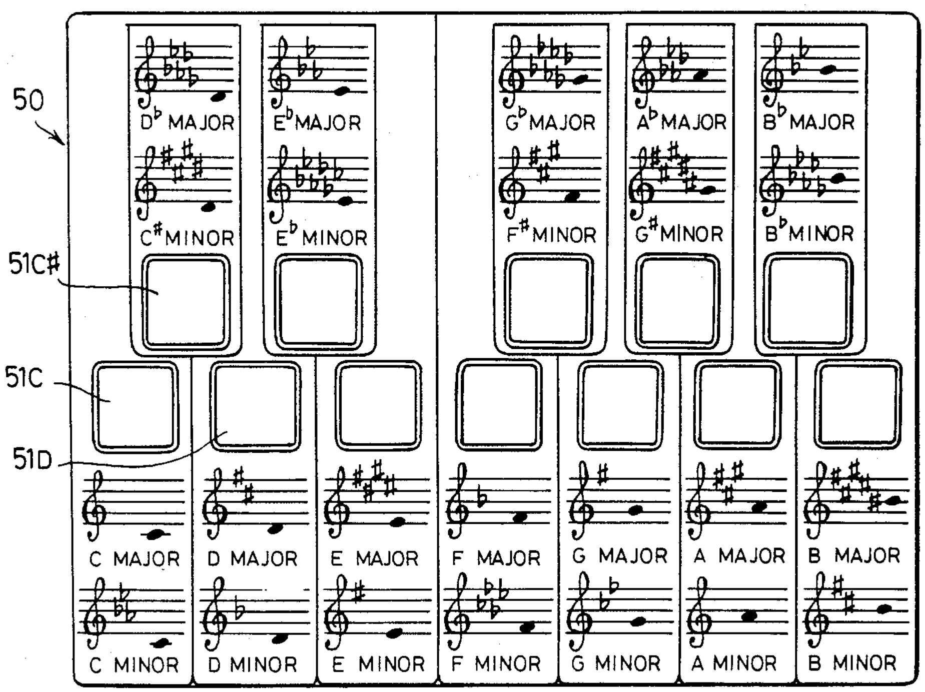
FIG. 6 is a general plan view showing a tonality selection part of another embodiment of an electronic keyboard instrument according to the present invention.

A tonality selection part 50 shown in FIG. 6 may be provided instead of the tonality selection keys 11. The tonality selection part 50 is displayed in the form of twelve instrument keys from the notes C through B, closely resembling the arrangement of instrument keys in the general keyboard. Characters indicating the key name for the case where the instrument key corresponds to the key-note, that is, the key-note instrument key, is displayed at a display part of each of the instrument keys of the tonality selection part 50. Thus, for example, displays "C MAJOR" and "C MINOR" are displayed at the display part of the instrument key corresponding to the note C, and displays "B MAJOR" and "B MINOR" are displayed at the display part of the instrument key corresponding to the note B, in the tonality selection part 50. In addition, the key for the case where the instrument key is the key-note key is displayed by score and accidentals, and further, the key-note is displayed by score and notes, at the display part of each of the instrument keys in the tonality selection part 50.

Characters, signs, lines, and the like are indicated in black on a white background, at parts of the tonality selection part 50 displaying the white keys of the keyboard. On the other hand, characters, signs, lines, and the like are indicated in white on a black background, at parts of the tonality selection part 50 displaying the black keys of the keyboard.

Key selection switches $51_C$, $51_{C\#}$, $51_D$, . . . are provided at the display part of each of the instrument keys in the tonality selection part 50.

When selecting the key, one key selection switch among the key selection switches $51_C$, $51_{C\#}$, . . . is pushed. By this operation, the output oscillation frequency of the variable frequency oscillator 16 and the frequency dividing ratios of each of the frequency dividers within the frequency dividing circuit 14 are respectively varied according to operations similar to those performed by the electronic keyboard instrument described in conjunction with FIG. 1., at the steps 34 through 38 shown in FIG. 4. As a result, just intonation sounds of the selected key can be obtained.

Incandescent electric lamps, light-emitting diodes (LEDs), and the like are provided at positions respectively corresponding to the display parts, on the back of each of the display parts of the instrument keys of the tonality selection part 50. Hence, the display parts of the instrument keys are illuminated by manipulating the switches $51_C$, $51_{C\#}$, . . . . In this case, the entire instrument keys, or a part of the display part of the key-signature by the score and the accidentals, the display part of the key name by the characters, the display part of the note, and the like may be illuminated. In addition, a hole may be formed at the display part corresponding to a note, and an LED may be fitted into this hole from the back, to display the note by turning ON the LED.

As described heretofore, the key name, the key-signature by the score and the accidentals, the key-note, and the like are displayed at the display part of each of the instrument keys of the tonality selection part 50. Moreover, The displays are illuminated by operating the instrument keys. Therefore, it is useful for a beginner in that the relationship between the instrument keys and the key, the method of indicating the key-signature, and the like, can easily be understood from these displays. Furthermore, it is possible to check that the electronic keyboard instrument is set to a state possible to generate just intonation sounds of the selected key.

Figure 7:
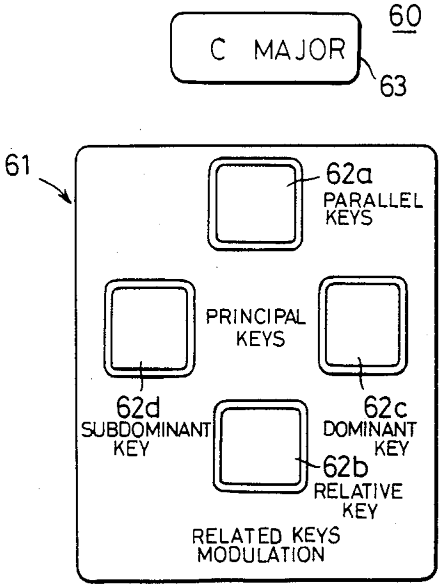
FIG. 7 is a general plan view showing an operation panel of still another embodiment of an electronic keyboard instrument according to the present invention.

FIG. 7 is a general view showing another embodiment of an operation panel of the electronic keyboard instrument according to the present invention. In FIG. 7, a related keys modulation switch part 61 is provided in an operation panel 60. Characters "PRINCIPAL KEY" are displayed at the center of the related keys modulation switch part 61, and tonality selection switches 62*a*, 62*b*, 62*c*, and 62*d* are respectively provided above, below, on the right, and on the left of the related keys modulation switch part 61. Characters "PARALLEL KEYS", "RELATIVE KEYS", "DOMINANT KEY", and "SUBDOMINANT KEY" are respectively indicated on the switches 62*a* through 62*d*. A tonality display part 63 is constituted by a cathode ray tube (CRT) and the like, and is provided above the switch 62*a*, for example.

Figure 8:
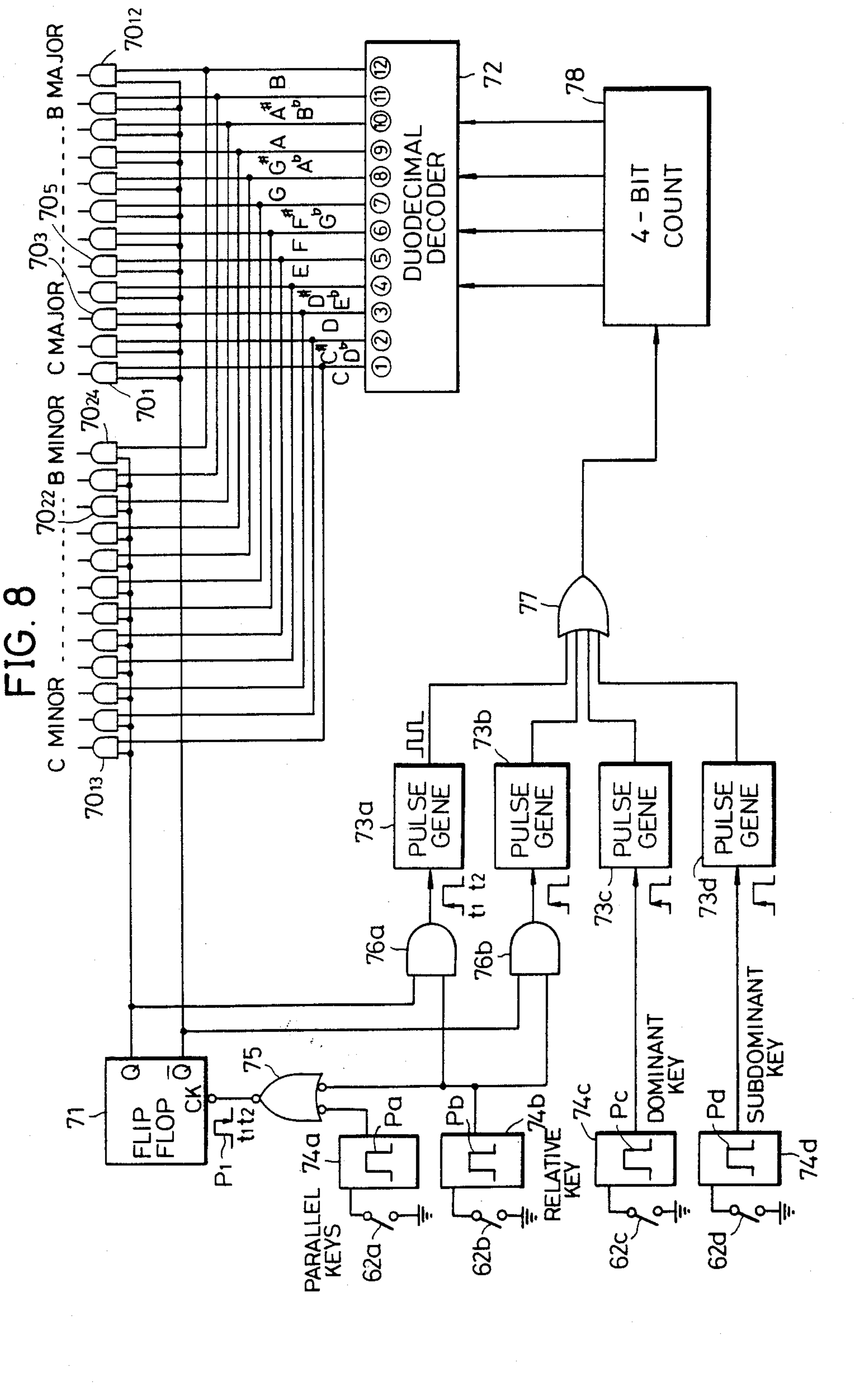
FIG. 8 is a circuit diagram showing a control circuit in the CPU of the electronic keyboard instrument according to the present invention having the operation panel shown in FIG. 7.

FIG. 8 shows a control circuit within the CPU 15 of the electronic keyboard instrument having the operation panel shown in FIG. 7. In FIG. 8, AND-gate circuits $70_{1}$ through $70_{12}$ are circuits for obtaining just intonation sound generating control signals of C major through B major. AND-gate circuits $70_{13}$ through $70_{24}$ are circuits for obtaining just intonation sound generating control signals of C minor through B minor. The AND-gate circuits $70_{1}$ through $70_{24}$ are respectively coupled to a major key/minor key specifying flip-flop circuit 71 which will be described hereinafter, and a duodecimal decoder 72 for key-note cycling. The flip-flop circuit 71 is set so as to produce a control signal for the major key when the Q-output is high and the Q-output is low, and produce a control signal for the minor key when the Q-output is low and the $\overline{Q}$-output is high.

Outputs of the AND-gate circuits $70_{1}$ through $70_{24}$ are processed within the CPU 15 shown in FIG. 2. Accordingly, as in the electronic keyboard instrument described in conjunction with FIG. 1, the output oscillation frequency of the variable frequency oscillator 16 and the frequency dividing ratios of each of the frequency dividers within the frequency dividing circuit 14 are simultaneously varied.

Figure 9:
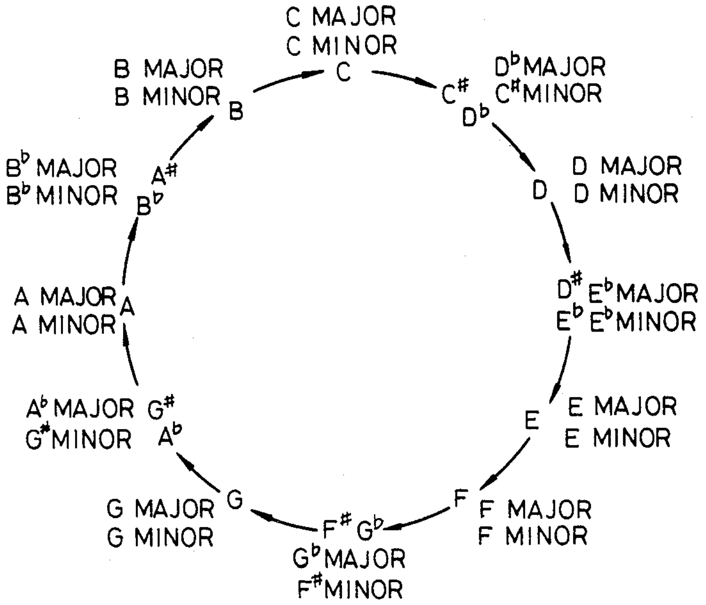
FIG. 9 shows a cyclic form of each of the tonality and positions of the key-note.

Next, analysis will be made on the relationship between each of the twenty-four tonality and the position of the key-note, and the relationship among these and the related keys. As shown in FIG. 9, the key-note of each of the keys are arranged according to the order of the instrument keys, and undergo cyclic change. For this reason, upon modulation of music to the related keys, the quantity over which the key-note moves is determined to a constant value according to the respective related keys regardless of which key the principal key is.

For example, the parallel keys relationship is such that the position of the key-note does not change, and only the major key and the minor key change (for example, C major←→C minor, and G minor←→G major). The relative key relationship is such that the key is a minor key having the ninth note obtained by following the cycle shown in FIG. 9 clockwise as the key-note when the principal key is the major key (for example, C major→A minor), and the key is a major key having the third note obtained by following the cycle shown in FIG. 9 clockwise as the key-note when the principal key is the minor key (for example, E minor→G major). The dominant key relationship is such that the relationship between the minor key and the major key does not change, and the key is a key having the seventh note obtained by following the cycle shown in FIG. 9 clockwise as the key-note (for example, D major→A major, and G minor→D minor). The subdominant key relationship is such that the relationship between the major key and the minor key does not change, and the key is a key having the fifth note obtained by following the cycle shown in FIG. 9 clockwise as the key-note (for example, G major→C major, and C minor→F minor).

Accordingly, when obtaining the just intonation sound of the related keys of the present principal key, the desired tonality can be obtained by moving positions of each of output terminals of the decoder 72 through which high-level principal key cycling control signals are obtained, by a quantity corresponding to the moving quantity of the key-note according to the parallel keys, relative key, dominant key, and subdominant key. Pulse generators 73*a* through 73*d* are provided as means for moving the positions of each of the output terminals of the decoder 72 through which the high-level principal key cycling control signals are obtained. The 3-pulse generator 73*a* is used for relative key modulation to the major key from the minor key, the 9-pulse generator 73*b* is used for relative key modulation to the minor key from the major key, the 7-pulse generator 73*c* is used for modulation to the dominant key, and the 5-pulse generator 73*d* is used for modulation to the subdominant key.

When the Q-output of the flip-flop circuit 71 is low, the $\overline{Q}$-output of the flip-flop circuit 71 is high, and a high-level signal is produced through an output terminal (1) of the decoder 72, the output of the AND-gate circuit $70_{1}$ becomes high, and this high-level output of the AND-gate circuit $70_{1}$ is processed within the CPU 15. Thus, the output oscillation frequency of the variable frequency oscillator 16 and the frequency dividing ratios of each of the frequency dividers within the frequency dividing circuit 14 are respectively set so that each of the frequencies in C major shown in FIG. 3 can be obtained, according to similar operations described in conjunction with the steps 36 through 38 shown in FIG. 4.

A character generator (not shown) is driven by the output of the AND-gate circuit $70_{1}$, and the tonality "C MAJOR" is displayed on the tonality display part 63 shown in FIG. 7, according to an output of the character generator. These operations correspond to a step 40 shown in FIG. 4.

When C minor which is the parallel keys of C major is to be obtained, the switch 62*a* is pushed by observing the characters of the related keys modulation switch part 61 of the operation panel 60. According to this operation, a signal Pa having a predetermined pulse width is obtained from a monostable multivibrator 74*a*, and a pulse $P_{1}$ is obtained from an AND-gate circuit 75 in response to a rising edge of the pulse Pa. The output polarity of the flip-flop circuit 71 is reversed in response to a falling edge of the pulse $P_{1}$ (at a time t2), and the Q-output assumes high level and the Q-output assumes low level, respectively. On the other hand, the signal obtained through the terminal (1) of the decoder 72 remains high. Hence, the output of the AND-gate circuit $70_{13}$ becomes high, according to the outputs of the flip-flop circuit 71 and the decoder 72.

The output of the AND-gate circuit $70_{13}$ is processed within the CPU 15, and the output oscillation frequency of the variable frequency oscillator 16 and the frequency dividing ratios of each of the frequency dividers within the frequency dividing circuit 14 are respectively set so that each of the frequencies in C minor shown in FIG. 5 can be obtained. When the player plays the play keys 12 in this state, a signal for obtaining the just intonation sounds in C minor shown in FIG. 5 is produced from the frequency divider corresponding to the played instrument key. The character generator (not shown) is driven by the output of the AND-gate circuit $70_{13}$, and the tonality "C MINOR? is displayed on the tonality display part 63 shown in FIG. 7, according to an output of the character generator.

Next, when obtaining A minor which is the relative key of C major, the switch 62*b* is pushed. According to this operation, a pulse Pb is obtained from a monostable multivibrator 74*b*, and this pulse Pb is supplied to one input terminal of an AND-gate circuit 76*b*. The Q-output of the flip-flop circuit 71 is still low and the $\overline{Q}$-output is still high at the rise in the pulse Pb (at a time t1), indicating that the key is a major key. Hence, An output of the AND-gate circuit 76*b* assumes high level, and this high-level output of the AND-gate circuit **76*b* is supplied to the pulse generator 73*b***.

Nine pulses are obtained from the pulse generator **73*b*, from the rise in the pulse Pb (at the time t1). These nine pulses are supplied to a 4-bit duodecimal counter 78 through an OR-gate 77. A 4-bit control signal in accordance with the nine pulses is produced from the counter 78, and supplied to the decoder 72. The positions of the output terminals of the counter 78 through which high-level control signals are obtained are moved according to the signal from the counter 78. In this case, the signal obtained through the terminal 1 through which the high-level signal was obtained up to that point assumes low level. On the other hand, a high-level signal is obtained through a terminal (10) positioned to the right of the terminal (1) by a number of terminals corresponding to the number of pulses obtained from the pulse generator 73*b***.

On the other hand, the Q-output of the flip-flop circuit 71 assumes high level and the $\overline{Q}$-output assumes low level, according to a fall in the pulse Pb obtained from the monostable multivibrator 74 (at the time t2). This indicates that the key is a minor key. Hence, the output of the AND-gate circuit $70_{22}$ becomes high. In this case, the position of the output terminal of the decoder 72 through which high-level signal is obtained is moved to a terminal position corresponding to the key-note of the key which is in the relative key relationship with respect to the principal key at the time t1 according to the output of the pulse generator **73*b*, because the monostable multivibrator 74*b* is provided. Next, the output of the AND-gate circuit corresponding to the tonality which is in the relative key relationship is made high at the time t2, according to the output of the flip-flop circuit 71**.

The reason why the monostable multivibratr **74*b* is provided, is because the output polarity of the flip-flop circuit 71 will reverse simultaneously with the operation of the switch 62*b* if the monostable multivibrator 74*b* is not provided. That is, if the monostable multivibrator 74*b* is not provided, the number of pulses corresponding to the key which is in the relative key relationship with the original key cannot be obtained from the pulse generator 73*b*, and it no longer becomes possible to accurately move the terminal positions of the decoder 72**.

The output oscillation frequency of the variable frequency oscillator 16 and the frequency dividing ratios of each of the frequency dividers within the frequency dividing circuit 14 are respectively set by the output of the AND-gate circuit $70_{22}$, so that each of the frequencies in A minor shown in FIG. 5 can be obtained. The character generator (not shown) is driven by the output of the AND-gate circuit $70_{22}$, and the tonality "A MINOR" is displayed on the display part 63.

Next, the switch **62*b* is pushed when D major which is the related key of B minor is to be obtained, for example. According to this operation, the pulse Pb is obtained from the monostable multivibrator 74*b*, and this pulse Pb is supplied to one input terminal of an AND-gate circuit 76*a*. At the rise time t1 of the pulse Pb, the Q-output of the flip-flop circuit 71 is high, and the $\overline{Q}$-output is low, indicating that the key is a minor key. The output of the AND-gate circuit 76*a* is made high, and the high-level output of the AND-gate circuit 76*a* is supplied to the pulse generator 73*a*. Three pulses are obtained from the pulse generator 73*a*, from the rise time t1 of the pulse Pb. These three pulses are supplied to the 4-bit counter 78 through the OR-gate 77. The counter 78 supplies a 4-bit control signal which is in accordance with the three pulses supplied thereto, to the decoder 72. In this case, the signal obtained through a terminal (12) corresponding to B minor through which a high-level signal was obtained up to that point, becomes low. On the other hand, a signal obtained through a terminal (3) which is moved to the right by a number of terminals corresponding to the number of pulses obtained from the pulse generator 73*a***, becomes high.

In addition, the Q-output of the flip-flop circuit 71 becomes low, and the $\overline{Q}$-output becomes high, at the fall time t2 of the pulse Pb obtained from the monostable multivibrator **74*b*, indicating that the key is in major. Accordingly, the output of the AND-gate circuit $70_3$ is made high. As a result, the constant ratios among the frequency dividing ratios of each of the frequency dividers within the frequency dividing circuit 14 are set by the CPU 15, based on the frequency divider corresponding to the D note which is the key-note of D major. Therefore, just intonation sounds in D major shown in FIG. 3 can be obtained. In addition, "D MAJOR" is displayed on the display part 63** according to the output of the AND-gate circuit $70_3$.

Next, when obtaining E major which is the dominant key of A major, for example, the switch **62*c* is pushed. According to this operation, a pulse Pc is obtained from a monostable multivibrator 74*c*, and seven pulses are obtained from the pulse generator 73*c*. A high-level signal is obtained from a terminal 10 corresponding to A major is obtained up to that point, however, the level of this signal becomes low. On the other hand, a high-level signal is obtained through a terminal 5 which is moved to the right by a number of terminals corresponding to the seven pulses obtained from the pulse generator 73*c*. At this point in time, the Q-output of the flip-flop circuit 71 is low, and the $\overline{Q}$-output is high, indicating that the key is a major key. Thus, the output of the AND-gate circuit $70_5$ becomes high. As a result, the output oscillation frequency of the variable frequency oscillator 16 and the frequency dividing ratios of each of the frequency dividers within the frequency dividing circuit 14 are respectively set by the CPU 15**, so that just intonation sounds in E major can be obtained.

The switch **62*d* is pushed when a subdominant key of a certain key is to be obtained. By operating this switch 62*d*, a pulse Pd is obtained from a monostable multivibrator 74*d* similarly as in the above described case of the dominant key. Five pulses are obtained from the pulse generator 73*d*, and the position of the output terminal of the decoder 72** through which a high-level signal is obtained is moved. The rest of the operation in this case can readily be understood from the description given heretofore, and detailed description will be omitted.

As described heretofore, the characters indicating each key of the related keys and the related selection switches are provided in correspondence with each other on the operation panel. Hence, when the related keys selection switch is manipulated, just intonation sounds of the related keys corresponding to the manipulated related keys selection switch can be obtained. Accordingly, it is easy to understand the relationship of the related keys with respect to the principal key. In addition, the number of switches required is reduced. As a result, it is easy to perform modulation operation. and the operation is simple even for a beginner such that erroneous operations are prevented and the music can be positively played. In addition, the electronic keyboard instrument according to the present invention can also be used effectively as a music teaching instrument, because the relationship of the related keys is displayed.

Figure 10:
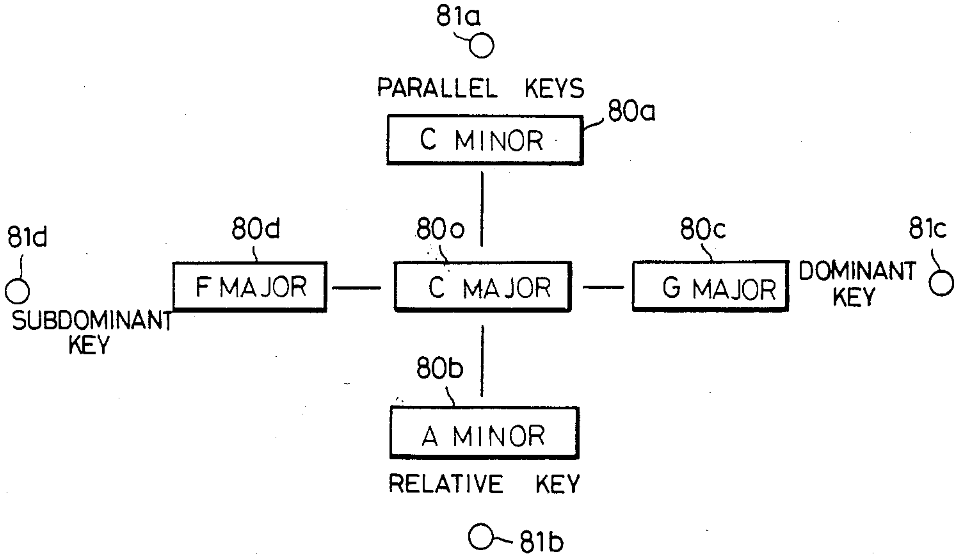
FIG. 10 is a general plan view showing another embodiment of an operation panel of the electronic keyboard instrument according to the present invention.

FIG. 10 is a general view showing another embodiment of an operation panel of the electronic keyboard instrument according to the present invention. In FIG. 10, a parallel keys display part 80*a*, relative key display part 80*b*, dominant key display part 80*c*, and subdominant key display part 80*d* are respectively provided above, below, to the right, and to the left of a display part $80_0$ for displaying the tonality of the principal key. These display parts are constructed from CRT and the like, and are designed to display characters according to a control signal from a character generator (not shown). Characters "PARALLEL KEYS", "RELATIVE KEY", "DOMINANT KEY", and "SUBDOMINANT KEY" are respectively provided in correspondence with the display parts 80*a* through 80*d*. In addition, tonality selection switches 81*a* through 81*d* are respectively provided in correspondence with each of these four character displays.

If the present tonality is C major, for example, the control signal from the AND-gate circuit $70_1$ shown in FIG. 8 is processed within the CPU 15 and the like. Hence, display control signals for displaying C major which is the principal key, and C minor, A minor, G major, and F major which are the related keys of C major, are supplied to the character generator (not shown) from the CPU 15. Signals corresponding to each of the related keys of the principle key are obtained from the character generator (not shown), and displays "C MAJOR", "C MINOR", "A MINOR", "G MAJOR", and "F MAJOR" are respectively displayed on the display parts $80_0$ and 80*a* through 80*d*.

As already described before in conjunction with FIG. 7, just intonation sounds of a desired key can be obtained by pushing a switch corresponding to that desired key. Further, the newly set key is displayed on the display part $80_0$, and the related keys of the newly set key are respectively displayed on the display parts 80*a* through 80*d*.

In this embodiment, the key names of each of the related keys of the principal key are all given by character displays on the display parts 80*a* through 80*d* in English, for example. Hence, the relationship of the related keys can readily be understood, and the operation of the electronic keyboard instrument is simple.

Dot-matrix light-emitting diodes and the like may be used instead of the CRT, for realizing the display parts $80_0$ and 80*a* through 80*d*.

Figure 11:
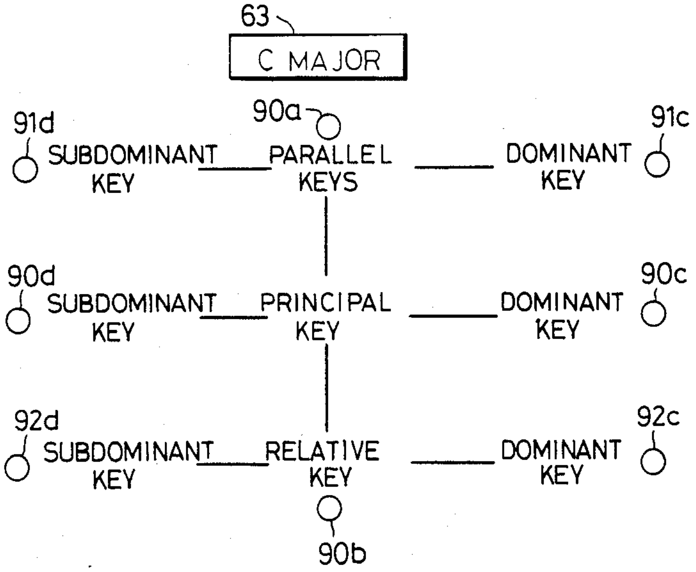
FIG. 11 is a general plan view showing still another embodiment of an operation panel of the electronic keyboard instrument according to the present invention.

FIG. 11 shows still another embodiment of an operation panel of the electronic keyboard instrument according to the present invention. In this embodiment, the four related keys of the principal key are displayed, and four related keys of these four related keys of the principal key are additionally displayed. As in the embodiments shown in FIGS. 7 and 10, the four related keys of the principal key are displayed above, below, to the right, and to the left of the principal key in the operation panel. Further, characters indicating "DOMINANT KEY" and "SUBDOMINANT KEY" are respectively displayed to the right and left of both the character displays of "PARALLEL KEYS" and "RELATIVE KEY". Switches 90*a* through 90*d* are provided in correspondence with the displays of the parallel keys, relative key, dominant key, and subdominant key. Moreover, switches 91*c* and 91*d* are provided in correspondence with the displays of the dominant key and subdominant key to the right and left of the display of the parallel keys, and switches 92*c* and 92*d* are provided in correspondence with the displays of the dominant key and subdominant key to the right and left of the display of the relative key.

The respective key-notes of the dominant key and subdominant key of the parallel keys of the principal key, are in a constant relationship with the key-note of the principal key. Similarly, the respective key-notes of the dominant key and subdominant key of the relative key of the principal key, are in a constant relationship with the key-note of the principal key. Hence, pulse generators similar to the pulse generators 73*a* through 73*d* shown in FIG. 8 may be provided with respect to each of the switches 91*c*, 91*d*, 92*c*, and 92*d*. By providing such frequency generators, the output signals of the decoder 72 may be circulated according to the manipulation of these switches 91*c*, 91*d*, 92*c*, and 92*d*.

In each of the embodiments described heretofore, the electronic keyboard instrument is designed so that the key corresponding to the manipulated switch becomes the principal key. Hence, a desired key may be obtained even when a key other than the related keys is selected, by manipulating the switches provided in the operation panel a few times.

The tonality display parts shown in FIG. 10 may be provideded in correspondence with the respective keys in the operation panel shown in FIG. 11.

Further, characters such as "PARALLEL KEYS" and "DOMINANT KEY" may be provided directly on the switches, in the operation panels shown in FIGS. 10 and 11.

Figure 12:
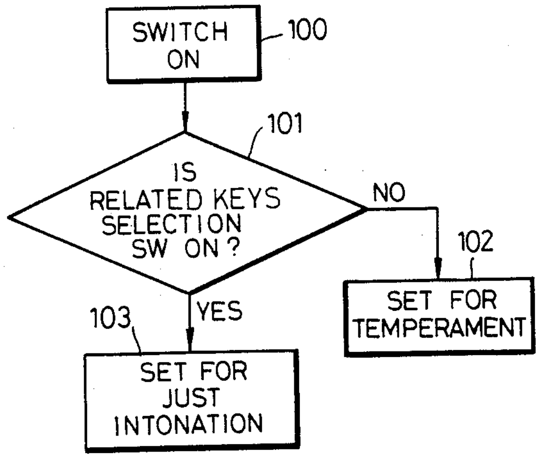
FIG. 12 is a flowchart for explaining the operation of the CPU in the electronic keyboard instrument according to the present invention or a further embodiment of an electronic keyboard instrument according to the present invention.

An equal temperament selection switch may be additionally provided in the operation panel 40 shown in FIG. 7. In this case, when a switch in the operation panel 40 is pushed at a step 100 shown in FIG. 12, a step 101 discriminates whether the pushed switch is the equal temperament selection switch or the related keys modulation switch. If the step 101 determines that the equal temperament selection switch was pushed, the output oscillation frequency of the variable frequency oscillator 16 and the frequency dividing ratios of each of the frequency dividers within the frequency dividing circuit 14 are respectively varied so that the temperament of equal temperament can be obtained. On the other hand, if the step 101 determines that the related keys modulation switch was pushed, the selected just intonation sounds are obtained at a step 103 according to operations similar to those performed at the steps 37 and 38 described in conjunction with FIG. 4, and in addition, the key is displayed. A principal key selection switch may be provided at the part where the display "principal key" is provided in the related keys modulation switch part 61 shown in FIG. 7. This principal key selection switch may be pushed in a state where the equal temperament is obtained, to return the state to a state immediately before the equal temperament selection switch is pushed.

By providing the equal temperament selection switch and a key selection switch for cancelling the operation of the equal temperament selection switch, the sound of the chord in the equal temperament and the sound of the chord in the just intonation can be compared, for example. Hence, this becomes useful when teaching on harmony in chorus, for example.

Further, the present invention is not limited to these embodiments, but various variations and modifications my be made without departing from the scope of the present invention.

What is claimed is:

1. A just intonation electronic keyboard instrument comprising:

a plurality of tonality selection switches for selecting each key from among twenty-four different just intonation keys, number of said tonality selection switches being less than twenty-four;

control means for discriminating selection of a major scale or a minor scale, discriminating one or a plurality of keys among each of twelve keys from C through B, and determining one or a plurality of keys from among said twenty-four just intonation keys, according to manipulation of said plurality of tonality selection switches;

variable frequency oscillator means responsive to the determined one or plurality of keys among said twenty-four just intonation keys, for generating an output oscillation frequency so that the output oscillation frequency is equal to a frequency which is an integral multiple of a frequency of a key-note of the key determined by said control means; and frequency dividing means comprising a plurality of frequency dividers respectively provided in correspondence with each of instrument keys of a keyboard for play, each of said plurality of frequency dividers being supplied with the output of said variable frequency oscillator means, each of frequency dividing ratios of said frequency dividers being varied so that ratios among the frequency dividing ratios are in accordance with a temperament of just intonation key determined by said control means.

2. A just intonation electronic keyboard instrument as claimed in claim 1 which further comprises display means for displaying one or a plurality of key names determined by said control means.

3. A just intonation electronic keyboard instrument as claimed in claim 2 in which said plurality of tonality selection switches are one octave of instrument keys provided in contiguity with the keyboard for play, and said control means discriminates a single manipulation of said tonality selection switches or two successive manipulations of said tonality selection switches and determines said one just intonation key.

4. A just intonation electronic keyboard instrument as claimed in claim 3 in which said one octave of instrument keys are provided on a bass side of said keyboard for play.

5. A just intonation electronic keyboard instrument as claimed in claim 3 in which said one octave of instrument keys are also used as instrument keys for play by a switching operation.

6. A just intonation electronic keyboard instrument as claimed in claim 2 in which said plurality of tonality selection switches are respectively provided at display parts which closely resemble one octave of instrument keys in an operation panel, and key name indication by characters, key-signature indication by score and accidentals, and key-note indication by score and notes are displayed at the display part of each of said instrument keys in said operation panel for a case where each of said instrument keys in said operation panel is the key-note.

7. A just intonation electronic keyboard instrument as claimed in claim 6 in which light-emitting means is provided at the display part of each of said instrument keys in said operation panel, and the light-emitting means provided at the display part of the instrument key in the operation panel corresponding to the key-note of the selected key is illuminated.

8. A just intonation electronic keyboard instrument as claimed in claim 7 in which said light-emitting means is provided throughout the entire display part of each of said instrument keys in said operation panel.

9. A just intonation electronic keyboard instrument as claimed in claim 7 in which said light-emitting means is provided at a position of a note corresponding to said key-note in said display part of said instrument key in said operation panel.

10. A just intonation electronic keyboard instrument as claimed in claim 2 in which said plurality of tonality selection switches are provided in an operation panel, and are four switches for respectively selecting four related keys of a principal key.

11. A just intonaton electronic keyboard instrument as claimed in claim 10 in which characters "PARALLEL KEYS", "RELATIVE KEY", "DOMINANT KEY", and "SUBDOMINANT KEY" are respectively displayed in the vicinity of said four switches in correspondence with these four switches provided in said operation panel.

12. A just intonation electronic keyboard instrument as claimed in claim 10 in which characters "PARALLEL KEYS", "RELATIVE KEY", "DOMINANT KEY", and "SUBDOMINANT KEY" are respectively displayed directly on said four switches in said operation panel.

13. A just intonation electronic keyboard instrument as claimed in claim 2 in which said plurality of tonality selection switches are provided in an operation panel, and are switches for respectively selecting four related keys of a principal key and selecting related keys with respect to the related keys of said principal key.

14. A just intonation electronic keyboard instrument as claimed in claim 2 in which said plurality of tonality selection switches are provided in an operation panel and are four switches for respectively selecting four related keys of a principal key, and said display means comprises four display parts provided in correspondence with said four switches so as to display the related keys and one display part for displaying said principal key.

* * * * *